(12) United States Patent
Weng

(10) Patent No.: US 12,031,717 B2
(45) Date of Patent: Jul. 9, 2024

(54) METHOD AND DEVICE FOR REGULATING A PROCESS WITHIN A SYSTEM, IN PARTICULAR A COMBUSTION PROCESS IN A POWER STATION

(71) Applicant: AIXPROCESS GMBH, Aachen (DE)

(72) Inventor: Martin Weng, Aachen (DE)

(73) Assignee: AIXPROCESS GMBH, Aachen (DE)

( * ) Notice: Subject to any disclaimer, the term of this patent is extended or adjusted under 35 U.S.C. 154(b) by 498 days.

(21) Appl. No.: 17/309,346

(22) PCT Filed: Nov. 12, 2019

(86) PCT No.: PCT/EP2019/081038
§ 371 (c)(1),
(2) Date: May 20, 2021

(87) PCT Pub. No.: WO2020/104255
PCT Pub. Date: May 28, 2020

(65) Prior Publication Data
US 2021/0404657 A1 Dec. 30, 2021

(30) Foreign Application Priority Data
Nov. 20, 2018 (IT) .................. 102018000010468

(51) Int. Cl.
*F23G 5/50* (2006.01)
*F23N 1/00* (2006.01)
(Continued)

(52) U.S. Cl.
CPC .............. *F23G 5/50* (2013.01); *F23N 1/002* (2013.01); *F23N 5/003* (2013.01); *F23N 5/184* (2013.01);
(Continued)

(58) Field of Classification Search
None
See application file for complete search history.

(56) References Cited

U.S. PATENT DOCUMENTS 7,637,735 B2    12/2009  Wintrich
2008/0046391 A1  2/2008  Wintrich et al.
(Continued)

FOREIGN PATENT DOCUMENTS

DE    102010062204    5/2012
EP       1396770      3/2004
(Continued)

OTHER PUBLICATIONS

International Search Report from corresponding PCT Appln. No. PCT/EP2019/081038, dated Dec. 18, 2019.
(Continued)

*Primary Examiner* — Jason Lau
(74) *Attorney, Agent, or Firm* — Grossman, Tucker, Perreault & Pfleger, PLLC

(57) ABSTRACT

A method and apparatus for controlling a process in a system comprising pre-processing of a raw material, processing the pre-processed raw material and acquisition of the result of the processing of the pre-processed raw material, comprising the steps of: capturing input and output variables of the pre-processing; capturing output variables of the processing of the pre-processed raw material; creating a first, second and third process model for at least two different time scales, which describes the effects of adapting the pre-processing of raw material, the effects of adapting the processing of the pre-processed raw material, the effects of adapting the pre-processing of raw material and adapting the processing of pre-processed raw material on the output variables of the processing of pre-processed raw material; wherein the process in the system is controlled using the prediction of the (Continued)

process model which currently provides the best predictions for the process in the system.

10 Claims, 1 Drawing Sheet

(51) Int. Cl.
*F23N 5/00* (2006.01)
*F23N 5/18* (2006.01)

(52) U.S. Cl.
CPC ...... *F23G 2207/10* (2013.01); *F23G 2207/20* (2013.01); *F23N 2221/10* (2020.01); *F23N 2223/36* (2020.01); *F23N 2225/26* (2020.01)

(56) References Cited

U.S. PATENT DOCUMENTS

| | | |
|---|---|---|
| 2008/0081302 A1 | 4/2008 | Wintrich et al. |
| 2008/0215165 A1 | 9/2008 | Wintrich et al. |
| 2009/0105852 A1 | 4/2009 | Wintrich et al. |
| 2009/0182441 A1 | 7/2009 | Wintrich et al. |
| 2013/0248626 A1 | 9/2013 | Held et al. |

FOREIGN PATENT DOCUMENTS

| | | |
|---|---|---|
| EP | 1850069 | 10/2007 |
| EP | 1890207 | 2/2008 |
| EP | 1906092 | 4/2008 |
| EP | 1967792 | 9/2008 |
| EP | 2048553 | 4/2009 |
| EP | 2080953 | 7/2009 |
| WO | 02077527 | 10/2002 |
| WO | 2007124981 | 11/2007 |
| WO | 2010121695 | 10/2010 |

OTHER PUBLICATIONS

International Preliminary Report on Patentability from corresponding PCT Appln. No. PCT/EP2019/081038, dated May 25, 2021.

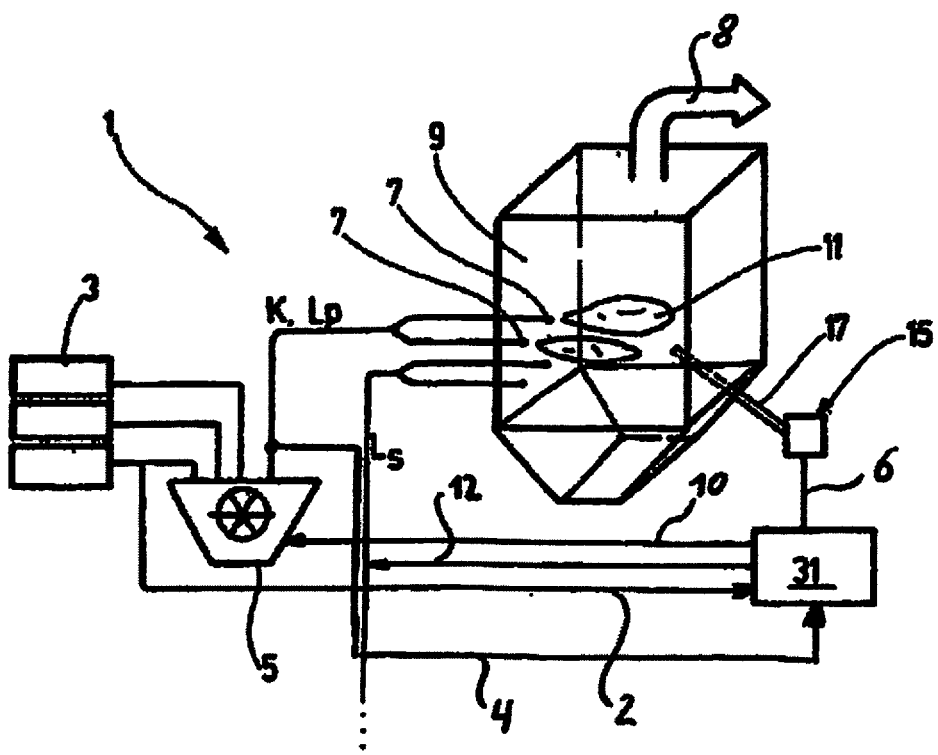

METHOD AND DEVICE FOR REGULATING A PROCESS WITHIN A SYSTEM, IN PARTICULAR A COMBUSTION PROCESS IN A POWER STATION

FIELD

The invention relates to a method and a device for controlling a process in a system, in particular a combustion process in a power plant, the process to be controlled comprising pre-processing of a raw material, processing the pre-processed raw material and acquisition of the result of the processing of the pre-processed raw material.

BACKGROUND

EP 1 364 163 B1 discloses a method and a device for controlling a combustion process, wherein in a boiler of a coal-fired power plant or of a waste incineration furnace state variables are measured, which are describing the state of the system in the boiler and are compared in a computer connected to the sensors with optimization goals with respect to pollutant concentration and actuating devices connected to the computer to form a control loop are controlled in order to carry out suitable actuating actions in the system. A process model independent of the optimization goals is determined, describing the effects of actuating actions on the state variables of the system when stepping to the state variables of the next point in time using the information about state variables in the past for integration into a time context and a situation assessment independent of the process model using quality functions, which assesses the state variables with respect to the optimization goals.

EP 1 396 770 B1 discloses a method and a device for controlling a thermodynamic process, in which process variables are measured in the system, predictions are calculated in a neural network using a trained, current process model, compared with optimization goals and actions in the system suitable for regulating the process are executed, wherein parallel in time to normal control operation the process is automatically analysed, from the determined model-relevant process variables several new process models for neural networks with different topology are formed, wherein the various types of neural networks are trained and compared with the current process model with regard to the predictions and If the predictions of one of the new process models are more accurate, the current process model is replaced by the new process model.

EP 1 850 069 B1 discloses a method and a control circuit for regulating a combustion process in a plant, particularly a power plant, a waste incineration plant or a cement plant, in which material is converted with the supply of air by means of the combustion process by forming at least one flame body, wherein the state variables describing the state of the system in the plant are determined using at least one observation device that visually captures the flame body and other sensors and are evaluated in a computer, whereupon suitable actions are selected, if necessary, in order to control actuating devices for at least the supply of material and/or air, wherein during a command control the setpoint values of the state variables and/or the stability of the combustion process are regulated. According to EP 1 850 069 B1, there is a temporary change from master control to fault control, according to which actions are selected in order to approach states of the system in the plant in which the state variables specifically deviate from the optimal setpoint within specified limits.

EP 1 890 207 B1 discloses a method and a control circuit for creating a process model for controlling a combustion process in a plant, in particular a power plant, a waste incineration plant or a cement plant, in which material is converted with the supply of air by means of the combustion process by forming at least one flame body and the state of the system in the system is described by state variables, wherein in a first step a neural network is applied, in a second step the neural network is trained with measurement data of the state variables, which include measurement data from input channels and measurement data from at least one output channel, and in a third step the neural network is tested with further measurement data from the input channels and measurement data from the output channel by predicting values of the output channel over time by the neural network, wherein from the deviations of the predicted values of the output channel from the measurement data of the output channel a predicted standard deviation is determined. In a fourth step, the measurement data of at least one input channel is replaced by a distribution according to a distribution curve over an interval of quantile values as portions of the distribution which correspond to an area portion under the distribution curve. In a fifth step, values of the output channel are calculated again with the distribution for each quantile value and a standard deviation of the calculated values of the output channel from the associated measurement data is determined, with the input channel being significant for neural network applied in the first step and trained in the second step if the calculated standard deviation is larger than the predicted standard deviation.

EP 1 906 092 B1 discloses a method and a system for regulating a combustion process in a system, particularly a power plant, a waste incineration system or a cement plant, in which material is converted with the supply of air by means of the combustion process and the state of the system in the system is described by state variables and regulated at least by means of a control loop. For at least one pair of correlated state variables groups of states are defined, which are comparable with regard to changes in the correlated state variables, wherein each group of comparable states being characterized with regard to their transition functions by parameters of a standard controller, and the parameters being adapted to data of actual states, and in the event of changes in the state of the system in the plant, the closest group of comparable states is selected and their transition functions, characterized by parameters, are used for regulation.

EP 1 967 792 B1 discloses a control circuit and a method for controlling a combustion process in a plant, particularly a power plant, a waste incineration plant or a cement plant, with a section for converting material with the supply of air by means of the combustion process with the formation of at least one flame body, at least one observation device that captures the flame body image and further sensors for determining input data, at least one actuating device for at least the supply of material and/or air controllable by output data and a computer for evaluating the input data in relation to target values and for determining the output data using a current process model. The computer has a feature extractor module which, in addition to the normal control, extracts features from the input data for an alternative process model by means of an information measure, which features are informative for the target values.

EP 2 048 553 B1 discloses a control loop for regulating a process, particularly a combustion process in a plant, particularly a power plant, a waste incineration plant or a cement plant, with a route, at least one measuring device for detecting observation values of the route, at least one actuating device acting on the route, which is controllable by action values and a controller to which the measuring device and the actuating device are connected and which evaluates the observation values of the measuring device, evaluates the state of the system of the route described by the observation values on the basis of target values and selects suitable action values to achieve the target values and controls the actuating device. The control device is characterized in that the controller has an input transducer which forms at least one probability distribution of the observation values from the observation values, that the controller has an action generator that generates a set of possible action values and another or the same input transducer generates a set of assigned distributions therefrom, that the controller has a process model unit with a stored process model, by means of which the controller can predict a set of distributions of probable future states of the system from the probability distribution of the observation values and the set of distributions assigned to the possible action values, which are given into the process model unit, that the controller evaluates the set of distributions of probable future states of the system on the basis of the target values and/or their distributions, particularly in an evaluation unit, and selects at least one probability distribution of the suitable action values, particularly in a selection unit, and that the controller has an output transducer which forms at least one action value from the probability distribution of the action values, the actuating devices being actuated executing specific actions assigned on the basis of the action values.

EP 2 080 953 B1 discloses a control loop and a method for controlling a combustion process in a plant, particularly a power plant, a waste incineration plant or a cement plant, with a section for converting material with the supply of air by means of the combustion process with the formation of at least one flame body, at least one observation device that captures the flame body image and further sensors to determine the state variables describing the state of the system in the plant, at least one controller and/or a computer for evaluating the state variables and a process model that selects suitable actions and actuating devices for at least the supply of material and/or air. The control loop or the method is characterized in that the process model has specialized function approximators for various process dynamics, of which a selector selects one, and a controller assigned to the selected function approximator is used to control the control loop.

EP 2 422 246 B1 discloses a control system for a complex real process to be controlled, particularly for controlling a combustion process in a power plant, a waste incineration plant or a cement plant, which is hierarchically divided into different levels, with a first level representing the complex, real process to be controlled and implemented by a control path, a second level representing an interface to the process and implemented by a process control system, a third level representing the controlling of the process and implemented by at least one active controller, and a fourth level representing a higher-level supervision and implemented by a main controller, which is characterized in that the main controller is set up to train simulators to simulate the control path, to develop a number of controllers and to test them on the simulators in order to find the best controller and to compare with the active controller and replace it if necessary, the set of controllers containing new controllers and also old controllers that were previously active controllers, with the active controller using the control deviation between the actual value of the controlled system and the setpoint to determine the actuation variable.

The aforementioned methods, devices and control loops relate to the controlling of a combustion process in a plant, particularly a power plant, a waste incineration plant or a cement plant. However, in the methods, devices and control loops known from the prior art, the effect of the type and manner of pre-processing of the raw material to be processed on the combustion process and the result of the combustion process is not taken into account.

SUMMARY

The present invention is therefore based on the object of providing a method and a device for controlling a process in a system, particularly a combustion process in a power plant, a waste incineration plant or a cement plant, wherein the process to be controlled comprises pre-processing of a raw material, processing of the pre-processed raw material and acquisition of the result of the processing of the pre-processed raw material and which is optimized with regard to predetermined control objectives.

The object is achieved according to the invention by a method for controlling a process in a system, in particular a combustion process in a power plant, a waste incineration plant or a cement plant, wherein the process to be controlled comprises pre-processing of a raw material, processing the pre-processed raw material and acquisition of the result of the processing of the pre-processed raw material. The inventive method comprises the following steps:

capturing input variables of the pre-processing of raw material over a first predetermined period, capturing output variables of the pre-processing of raw material over a second predetermined period, which correspond to the input variables of the processing of the pre-processed raw material, and capturing output variables of the processing of the pre-processed raw material over a third predetermined period, which correspond to the result of the processing of the pre-processed raw material.

The process in the system is controlled by:

adapting the pre-processing of the raw material by means of carrying out actuating actions regarding the pre-processing of the raw material, and/or by adapting the processing of the pre-processed raw material by carrying out actuating actions regarding the processing of the pre-processed raw material.

The inventive method further comprises the following steps:

creating a first process model, which describes the effects of adapting the pre-processing of raw material on the output variables of the processing of the pre-processed raw material, creating a second process model, which describes the effects of adapting the processing of the pre-processed raw material on the output variables of the processing of the pre-processed raw material; and creating a third process model, which describes the effects of adapting the pre-processing of raw material and adapting the processing of pre-processed raw material on the output variables of the processing of pre-processed raw material.

According to the invention the first process model, the second process model and the third process model are each created for at least two different time scales, wherein the process in the system is controlled by adapting the pre-processing of the raw material and/or adapting the processing of the pre-processed raw material taking into account control objectives for the result of the processing of the pre-processed raw material according to the predictions of at least one of the created process models, preferably the process model which currently provides the best predictions for the process in the system.

The inventive method for controlling of a process in a system, particularly a combustion process in a power plant, a waste incineration plant or a cement plant, comprises a pre-processing of a raw material, a processing of the pre-processed raw material and an acquisition of the result of the processing of the pre-processed raw material. The pre-processing of the raw material comprises, for example, the milling/grinding of the raw material, preheating of the raw material and/or mixing of different raw materials.

According to the invention, the input variables of the pre-processing of the raw material, the output variables of the pre-processing of the raw material and the output variables of the processing of the pre-processed raw material are detected over a respective predetermined period of time. The output variables of the pre-processing of the raw material and/or the processing of the pre-processed raw material are recorded, for example, automatically by sensors or by means of automatic or manual sampling.

To control the process in the system, the pre-processing of the raw material and/or the processing of the pre-processed raw material can be adapted. The pre-processing of the raw material is adapted, for example, by adapting the milling/grinding of the raw material, adapting the preheating of the raw material and/or adapting the mixture of different raw materials. The processing of the pre-processed raw material can be adjusted, for example, by supplying oxygen or other substances, adapting the combustion of the pre-processed raw material or by taking measures relating to the combustion boiler.

The inventive method comprises the following steps:
creating a first process model, which describes the effects of adapting the pre-processing of raw material on the output variables of the processing of the pre-processed raw material,
creating a second process model, which describes the effects of adapting the processing of the pre-processed raw material on the output variables of the processing of the pre-processed raw material; and
creating a third process model, which describes the effects of adapting the pre-processing of raw material and adapting the processing of pre-processed raw material on the output variables of the processing of pre-processed raw material.

The first process model describes the effects of adapting the pre-processing of the raw material on the output variables of the processing of the pre-processed raw material, i.e. the effects of adapting the pre-processing on the final result of the process to be controlled. The second process model describes the effects of adapting the processing of the pre-processed raw material on the output variables of the processing of the pre-processed raw material, i.e. the effects of adapting the processing of the pre-processed raw material. And the third process model combines the first process model and the second process model and describes the effects of adapting the pre-processing of the raw material and the processing of the pre-processed raw material on the output variables of the processing of the pre-processed raw material.

The invention is based on the findings that the process in the system, taking into account the control objectives, is mapped with sufficient accuracy by one of the aforementioned process models in order to control the process in the system. Depending on the current process situation, an adaption of the pre-processing of the raw material or an adaption of the processing of the pre-processed raw material or an adaption of the pre-processing of the raw material and an adaption of the processing of the pre-processed raw material may be necessary in order to achieve the control objectives and to fulfill them in future.

According to the invention, the first process model, the second process model and the third process model are each created for at least two different time scales. A distinction is preferably made between a short-term and a long-term forecast.

The classification in short-term, fault-related changes and longer-term, fault-related changes depends on the process in the system to be controlled. In a combustion process in a power plant, for example, short-term, fault-related changes can occur over several hours. The classification in short-term, fault-related changes and longer-term, fault-related changes preferably considers the length of the process in the system to be controlled.

According to the invention, the process in the system is controlled by adapting the pre-processing of the raw material and/or adapting the processing of the pre-processed raw material, considering control objectives for the result of the processing of the pre-processed raw material according to the predictions of at least one of the created process models, preferably the process model that currently provides the best predictions for the process in the system.

Creating at least three process models for at least two different time scales each has the advantage that a process model is available that maps the process in the system with sufficient accuracy for both short-term and long-term control scenarios for the result of the processing of the pre-processed raw material to fulfill the control objectives.

Pursuant to a preferred variant of the invention the first process model, the second process model and/or the third process model are created for three different time scales. As stated above, the different time scales relate to a short-term and a long-term prediction of the process in the process to be controlled. The third time scale further relates to a disturbance-related prediction of the process in the system. Thus, on the basis of the third time scale it can be determined whether a control should be carried out due to a disturbance or whether the disturbance has no significant influence on the control objectives. Such a disturbance-related prediction can also be used to make a statement as to whether the disturbance can be corrected or whether a maintenance measure or the like must be carried out.

According to a variant of the invention, when selecting one of the created process models for controlling the process in the system first a relevant time scale is determined. The invention is based on the findings that short-term deviations of the output variables of the processing of the pre-processed raw material from the control objectives differ from long-term deviations of the output variables of the processing of the pre-processed raw material from the control objectives. Since the predictions of the three long-term process models differ from the three short-term process models, according to the invention, a selection is first made with regard to the relevant time scale.

Pursuant to a variant of the invention the relevant time scale is determined on the basis of the input and output variables captured over the first predetermined time period, over the second predetermined time period and over the third predetermined time period. In particular, changes in input and output variables are preferably taken into account.

Larger changes in the output variables within a short period of time are an indication that a short-term time scale is relevant, while a slow and steady change in the output variables is an indication of a long-term time scale.

In a preferred variant of the invention, the process models created for a specific time scale are compared with each other for selecting the process model for controlling the process in the system. After a relevant time scale has been identified, next the process model that currently provides the best predictions for the process in the system is determined. The current and previous predictions of the individual process models are preferably compared with the captured respective output variables of the processing of the pre-processed raw material and compared with the control objectives. Thereby the process model can be determined, which currently provides the best prediction for the process in the system.

According to a particularly preferred variant of the invention, the process model for controlling the process in the system is selected by an algorithm implemented in a neural network. The neural network is based in particular on evolutionary strategies, genetic algorithms, genetic programming or evolutionary programming, respectively the process models are trained on the basis thereof, preferably in the context of an autonomous selection and/or optimization process.

The use of neural networks has the advantage that the choice of the process models increases steadily over the duration of the process due to the self-learning properties of the neural networks.

Pursuant to an expedient variant of the invention the process model for controlling the process in the system is selected at least partially automatically, preferably fully automatically. For example, when controlling risky or safety-relevant processes, it may be necessary and/or useful that the process model for controlling the process in the system is selected automatically, but manual confirmation from the responsible operating person is necessary before the new selected process model is used.

In a variant the method according to the invention comprises the steps of capturing state variables of the pre-processing of the raw material and of capturing state variables of the processing of the pre-processed raw material. Thus, not only the input and output variables of the pre-processing of the raw material and the processing of the pre-processed raw material are captured, but also the respective current state variables. Thereby the accuracy of the method according to the invention is improved.

Pursuant to an expedient variant of the invention the state variables of the pre-processing of the raw material and/or the state variables of the processing of the pre-processed raw material are taken into account when creating the first process model, the second process model and/or the third process model, whereby the prediction accuracy of the created process models can be improved.

The state variables are captured, for example, automatically by means of sensors or manually or automatically by means of taking samples.

According to a variant of the inventive method the created process models are continuously adapted to the behaviour of the process in the system to be controlled. The prediction accuracy of the created process models increases steadily over the duration of the process due to this self-learning property.

The process models are created, for example, through a test run of the system and/or through expert knowledge. In the test run of the system, it is advantageous to intentionally deviate from the usual state variables and to approach extreme states in the process. It is particularly expedient if a process model is first created using expert knowledge and this is subsequently further improved or trained by means of a test run of the system with different states.

Pursuant to an expedient variant of the invention the process models are each created by means of a computer-aided neural network and, in particular, are continuously adapted (trained). The neural network is based in particular on evolutionary strategies, genetic algorithms, genetic programming or evolutionary programming respectively the process models are trained on the basis thereof, preferably in the context of an autonomous selection and/or optimization process.

The use of neural networks has the advantage that the prediction accuracy of the process models increases steadily over the process duration due to the self-learning properties of the neural networks.

In a variant of the method according to the invention the process models each take into account several assumed future effects of adapting the pre-processing of the raw material and/or effects of adapting the processing of the pre-processed raw material on the output variables of the processing of the pre-processed raw material. The created process models therefore consider not only the current process situation in the system and the control objectives, but also how the control objectives can be met as long as possible, preferably while minimizing adaption to the pre-processing of raw material by carrying out actuating actions regarding the pre-processing of raw material and/or adaption to the processing of the pre-processed raw material by carrying out actuating actions regarding the processing of the pre-processed raw material.

The method is expediently carried out in real time to control the process in the system.

According to a particularly preferred variant of the invention the process models are based on the numerical fluid mechanic methods.

The object is further achieved by an apparatus for executing a method for controlling a process in a system, in particular a combustion process in a power plant, a waste incineration plant or a cement plant, according to the present invention, wherein the apparatus comprises at least one computing device and means for detecting variables of the system and interfaces for transmitting actuating actions to the system. The apparatus can be, for example, designed as a control loop. It is preferably integrated into the process control of the system to be controlled.

BRIEF DESCRIPTION OF THE DRAWINGS

In the following the invention is further explained with respect to an exemplary embodiment. It shows:

FIG. 1 a power plant, the combustion process which is controlled by means of a method according to the invention.

DETAILED DESCRIPTION

The method according to the invention is used to control a process in a system, particularly a combustion process in a power plant 1, a waste incineration plant or a cement plant.

The power plant 1 of FIG. 1 comprises a plurality of bunker 3 with coarse grain, medium grain and fine grain coal concentrate, from which at least one mill 5 is fed. Instead of coal in principle another fuel could also be used or mixed in. The at least one mill 5 is used to pre-process the material stored in the bunkers 3.

According to the inventive method the input variables of the pre-processing 2 of the raw material, i.e. of the mill 5, are captured over a first period. This is done automatically by means of appropriate sensors or by manually and/or automatically taking samples.

The coal K output by the at least one mill 5 is fed together with primary air $L_P$ to a burner 7 in a furnace 9, wherein one mill 5 preferably charging several burners 7.

According to the invention the output variables of the pre-processing 4 of the raw material, i.e. the variables of the milled coal K after the mill 5 and before the furnace 9, are captured over a second predetermined period of time. This is done automatically by means of appropriate sensors or manually and/or automatically by taking samples. The output variables of the coal K of the mill 5 correspond to the input variables of the coal K of the furnace 9.

The coal K is burned by means of burners 7 of the furnace 9, i.e. processed in the furnace 9. For example, secondary air $L_S$ is blown into the furnace below the burner 7. According to the inventive method the output variables of the processing of the pre-processed raw material 6, i.e. the combustion of the coal K by means of the burner 7, are captured over a third predetermined period of time. This corresponds to the result of processing the pre-processed raw material.

The output variables of the processing of the pre-processed raw material 6 are captured, for example, by means of an optical measuring device 15 which has a borescope 17 protruding into the furnace. The borescope 17 images a picture of the flames 11 of the burners 7 in the interior of the measuring device, which processes the image and thus output variables for the processing of the pre-processed raw material 6. Alternatively and/or additionally, components of the exhaust air 8 of the combustion process can be captured by means of sensors and/or sample taking as output variables of the processing of the pre-processed raw material 6.

The process in the system, i.e. the combustion in the furnace 9 of the power plant 1, is controlled by adapting the pre-processing of the raw material 10 by performing actuating actions relating to the pre-processing of the raw material, i.e. the milling of the raw material. Alternatively or additionally, the process within the system is controlled by adapting the processing of the pre-processed raw material 12 by performing actuating actions relating to the processing of the pre-processed raw material, for example by adjusting the supply of the secondary air $L_S$ into the furnace 9.

The captured input variables of the pre-processing 2, the output variables of pre-processing 4 and the output variables of the processing of the pre-processed raw material are transmitted to a computing device 31, which is designed to control the process in the system, i.e. the combustion in the power plant 1. For this purpose, the computing device 31 adapts the pre-processing of the raw material 10 by performing actuating actions relating to the pre-processing of the raw material and/or adapts the processing of the pre-processed raw material 12 by performing actuating actions relating to the processing of the pre-processed raw material.

Inside the computing device a first process model, which describes the effects of adapting the pre-processing of the raw material 10 on the output variables of the processing of the pre-processed raw material 6, and a second process model, which describes the effects of adapting the processing of the pre-processed raw material 12 on the output variables of the processing of the pre-processed raw material 6 is created. Furthermore, a third process model is created inside the computing device 31, which describes the effects of adapting the pre-processing of the raw material 10 and adapting the processing of the pre-processed raw material 12 on the output variables of the processing of the pre-processed raw material 6.

According to the invention, the first process model, the second process model and the third process model are each created for at least two different time scales.

The process in the system is controlled by adapting the pre-processing of the raw material 10 and/or adapting the processing of the pre-processed raw material 12, taking into account control objectives for the result of the processing of the pre-processed raw material according to the predictions of at least one of the created process models, preferably the process model which currently provides the best predictions for the process in the system.

Creating at least three process models for at least two different time scales each has the advantage that a process model is available for short-term and long-term control scenarios that describes the process in the system with sufficient accuracy to meet the control objectives.

Pursuant to a preferred variant of the invention the first process model, the second process model and/or the third process model are created for three different time scales. As already stated above, the different time scales relate to a short-term and a long-term prediction of the process in the process to be controlled. The third time scale further relates to a disturbance-related prediction of the process in the system. Thus, on the basis of the third time scale it can be determined whether a control should be carried out due to a disturbance or whether the disturbance has no significant influence on the control objectives. Such a disturbance-related prediction can also be used to make a statement as to whether the disturbance can be corrected or whether a maintenance measure or the like must be carried out According to a variant of the invention, when selecting one of the created process models for controlling the process in the system first a relevant time scale is determined. The invention is based on the findings that short-term deviations of the output variables of the processing of the pre-processed raw material from the control objectives differ from long-term deviations of the output variables of the processing of the pre-processed raw material from the control objectives. Since the predictions of the three long-term process models differ from the three short-term process models, according to the invention, a selection is first made with regard to the relevant time scale.

Pursuant to a variant of the invention the relevant time scale is determined on the basis of the input and output variables 2, 4, 6 captured over the first predetermined time period, over the second predetermined time period and over the third predetermined time period. In particular, changes in input and output variables are preferably taken into account. Larger changes in the output variables within a short period of time are an indication that a short-term time scale is relevant, while a slow and steady change in the output variables is an indication of a long-term time scale.

In a preferred variant of the invention, the process models created for a specific time scale are compared with each other for selecting the process model for controlling the process in the system. After a relevant time scale has been identified, next the process model that currently provides the best predictions for the process in the system is determined. The current and previous predictions of the individual process models are preferably compared with the captured respective output variables of the processing of the pre-processed raw material and compared with the control objectives. Thereby the process model can be determined, which currently provides the best prediction for the process in the system.

According to a particularly preferred variant of the invention, the process model for controlling the process in the system is selected by an algorithm implemented in a neural network. The neural network is based in particular on evolutionary strategies, genetic algorithms, genetic programming or evolutionary programming, respectively the process models are trained on the basis thereof, preferably in the context of an autonomous selection and/or optimization process.

The use of neural networks has the advantage that the choice of the process models increases steadily over the duration of the process due to the self-learning properties of the neural networks.

Pursuant to an expedient variant of the invention the process model for controlling the process in the system is selected at least partially automatically, preferably fully automatically.

In a variant the method according to the invention comprises the steps of capturing state variables of the pre-processing of the raw material and of capturing state variables of the processing of the pre-processed raw material. Thus, not only the input and output variables of the pre-processing of the raw material and the processing of the pre-processed raw material are captured, but also the respective current state variables. Thereby the accuracy of the method according to the invention is improved.

Pursuant to an expedient variant of the invention the state variables of the pre-processing of the raw material and/or the state variables of the processing of the pre-processed raw material are taken into account when creating the first process model, the second process model and/or the third process model, whereby the prediction accuracy of the created process models can be improved.

The state variables are captured, for example, automatically by means of sensors or manually or automatically by means of taking samples.

According to a variant of the inventive method the created process models are continuously adapted to the behaviour of the process in the system to be controlled. The prediction accuracy of the created process models increases steadily over the duration of the process due to this self-learning property.

The process models are created, for example, through a test run of the system and/or through expert knowledge. In the test run of the system, it is advantageous to intentionally deviate from the usual state variables and to approach extreme states in the process. It is particularly expedient if a process model is first created using expert knowledge and this is subsequently further improved or trained by means of a test run of the system with different states.

Pursuant to an expedient variant of the invention the process models are each created by means of a computer-aided neural network and, in particular, are continuously adapted (trained). The neural network is based in particular on evolutionary strategies, genetic algorithms, genetic programming or evolutionary programming respectively the process models are trained on the basis thereof, preferably in the context of an autonomous selection and/or optimization process.

The use of neural networks has the advantage that the prediction accuracy of the process models increases steadily over the process duration due to the self-learning properties of the neural networks.

In a variant of the method according to the invention the process models each take into account several assumed future effects of adapting the pre-processing of the raw material and/or effects of adapting the processing of the pre-processed raw material on the output variables of the processing of the pre-processed raw material. The created process models therefore consider not only the current process situation in the system and the control objectives, but also how the control objectives can be met as long as possible, preferably while minimizing adaption to the pre-processing of raw material 10 by carrying out actuating actions regarding the pre-processing of raw material and/or adaption to the processing 12 of the pre-processed raw material by carrying out actuating actions regarding the processing of the pre-processed raw material.

The method is expediently carried out in real time to control the process in the system.

According to a particularly preferred variant of the invention the process models are based on the numerical fluid mechanic methods.

LIST OF REFERENCE NUMERALS 1 power plant
2 capturing input variables of the pre-processing
3 bunkers
4 capturing output variables of the pre-processing
5 mill
6 capturing output variables of the pre-processing
7 burner
8 exhaust air combustion process
9 furnace
10 adapting pre-processing of the raw material
11 flame
12 adapting processing of the pre-processed raw material
15 measuring device
17 borescope
31 computing device
K coal
$L_P$ primary air
$L_S$ secondary air

What is claimed is:

1. A method for controlling a process in a system, particularly a combustion process in a power plant, a waste incineration plant or a cement plant, the process to be controlled comprising pre-processing of a raw material, processing the pre-processed raw material and acquisition of the result of the processing of the pre-processed raw material, the method comprising the following steps:
  capturing input variables of the pre-processing of raw material over a first predetermined period;
  capturing output variables of the pre-processing of raw material 4 over a second predetermined period, which correspond to the input variables of the processing of the pre-processed raw material; and
  capturing output variables of the processing of the pre-processed raw material 6 over a third predetermined period, which correspond to the result of the processing of the pre-processed raw material, wherein the process in the system is controlled by:
    adapting the pre-processing of the raw material by means of carrying out actuating actions regarding the pre-processing of the raw material; and/or
    by adapting the processing of the pre-processed raw material by carrying out actuating actions regarding the processing of the pre-processed raw material, wherein the method further comprises the following steps:

creating a first process model, which describes the effects of adapting the pre-processing of raw material on the output variables of the processing of the pre-processed raw material;

creating a second process model, which describes the effects of adapting the processing of the pre-processed raw material on the output variables of the processing of the pre-processed raw material; and creating of a third process model, which describes the effects of adapting the pre-processing of raw material and adapting the processing of pre-processed raw material on the output variables of the processing of pre-processed raw material, wherein:

the first process model, the second process model and the third process model are each created for at least two different time scales;

the process in the system is controlled by adapting the pre-processing of the raw material and/or adapting the processing of the pre-processed raw material taking into account control objectives for the result of the processing of the pre-processed raw material according to the predictions of at least one of the created process models.

2. The method according to claim 1, wherein during selection of one of the process models created for controlling the process in the system, first a relevant time scale is first determined.

3. The method according to claim 2, wherein the relevant time scale is determined on basis of the input and output variables captured over the first predetermined period, the second predetermined period and the third predetermined period.

4. The method according to claim 3, wherein the process models created for a specific time scale are compared with each other for selecting the process model for controlling the process in the system.

5. The method according to claim 1, wherein the process model for controlling the process in the system is selected by an algorithm implemented in a neural network.

6. The method according to claim 1, further comprising the steps of:

capturing of state variables of the pre-processing of the raw material; and capturing of state variables of the processing of the pre-processed raw material.

7. The method according to claim 6, wherein the creation of the first process model, the second process model and/or the third process model takes into account the state variables of the pre-processing of the raw material and/or the state variables of the processing of the pre-processed material.

8. The method according to claim 1, wherein the created process models are continuously adapted to the behaviour of the process in the system to be controlled.

9. The method according to claim 1, wherein the process models each take into account several assumed future effects of adapting the pre-processing of the raw material and/or effects of adapting the processing of the pre-processed raw material on the output variables of the processing of the pre-processed raw material.

10. An apparatus for executing a method for controlling a process in a system, in particular a combustion process in a power plant, a waste incineration plant or a cement plant, according to claim 1, wherein the apparatus comprises at least one computing device for detecting variables of the system and interfaces for transmitting actuating actions to the system.

* * * * *